US010749622B2

(12) United States Patent
Nagarajan

(10) Patent No.: US 10,749,622 B2
(45) Date of Patent: Aug. 18, 2020

(54) OPTICAL MODULE

(71) Applicant: INPHI Corporation, Santa Clara, CA (US)

(72) Inventor: Radhakrishnan L. Nagarajan, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 16/813,504

(22) Filed: Mar. 9, 2020

(65) Prior Publication Data

US 2020/0213025 A1 Jul. 2, 2020

Related U.S. Application Data

(63) Continuation of application No. 16/431,492, filed on Jun. 4, 2019, now Pat. No. 10,630,414, which is a continuation of application No. 16/034,668, filed on Jul. 13, 2018, now Pat. No. 10,355,804, which is a continuation of application No. 15/694,472, filed on Sep. 1, 2017, now Pat. No. 10,050,736, which is a continuation of application No. 15/375,031, filed on Dec. 9, 2016, now Pat. No. 9,787,423, which is a continuation of application No. 14/625,489, filed on Feb. 18, 2015, now Pat. No. 9,553,670.

(60) Provisional application No. 61/947,374, filed on Mar. 3, 2014.

(51) Int. Cl.
*H04J 14/02* (2006.01)
*H04B 10/40* (2013.01)

(52) U.S. Cl.
CPC .............. *H04J 14/02* (2013.01); *H04B 10/40* (2013.01)

(58) Field of Classification Search
CPC ................................. H04J 14/02; H04B 10/40
USPC ........................................................... 398/79
See application file for complete search history.

(56) References Cited

U.S. PATENT DOCUMENTS 5,592,612 A   1/1997 Birk
6,128,094 A  10/2000 Smith
6,381,047 B1 * 4/2002 Frigo .................. H04B 10/506
                                                              398/79

(Continued)

OTHER PUBLICATIONS

Office Action for U.S. Appl. No. 13/619,692, dated May 14, 2014.

(Continued)

*Primary Examiner* — Mohammad R Sedighian
(74) *Attorney, Agent, or Firm* — Richard T. Ogawa; Ogawa P.C.

(57) ABSTRACT

An integrated apparatus with optical/electrical interfaces and protocol converter on a single silicon substrate. The apparatus includes an optical module comprising one or more modulators respectively coupled with one or more laser devices for producing a first optical signal to an optical interface and one or more photodetectors for detecting a second optical signal from the optical interface to generate a current signal. Additionally, the apparatus includes a transmit lane module coupled between the optical module and an electrical interface to receive a first electric signal from the electrical interface and provide a framing protocol for driving the one or more modulators. Furthermore, the apparatus includes a receive lane module coupled between the optical module and the electrical interface to process the current signal to send a second electric signal to the electrical interface.

19 Claims, 16 Drawing Sheets

(56) References Cited

U.S. PATENT DOCUMENTS

| | | |
|---|---|---|
| 6,400,621 B2 | 6/2002 | Hidaka et al. |
| 6,542,956 B1 | 4/2003 | Lee et al. |
| 6,993,701 B2 | 1/2006 | Corbett et al. |
| 7,656,727 B2 | 2/2010 | Thayer |
| 7,990,746 B2 | 8/2011 | Rajan |
| 8,325,554 B2 | 12/2012 | Sweere et al. |
| 8,687,451 B2 | 4/2014 | Wang |
| 9,031,359 B2 * | 5/2015 | Matsui ............... G02B 6/29355 385/3 |
| 10,050,736 B2 * | 8/2018 | Nagarajan ............. H04B 10/40 |
| 10,355,804 B2 * | 7/2019 | Nagarajan ............. H04J 14/02 |
| 2002/0027684 A1 * | 3/2002 | Ait Sab .................. H04L 1/004 398/79 |
| 2004/0123029 A1 | 6/2004 | Dalal et al. |
| 2006/0200697 A1 | 9/2006 | Ito |
| 2008/0104290 A1 | 5/2008 | Cowell et al. |
| 2008/0183959 A1 | 7/2008 | Pelley et al. |
| 2009/0141558 A1 | 6/2009 | Sarin et al. |
| 2009/0300259 A1 | 12/2009 | Luo et al. |
| 2010/0005212 A1 | 1/2010 | Gower et al. |
| 2010/0162037 A1 | 6/2010 | Maule et al. |
| 2010/0199125 A1 | 8/2010 | Reche |
| 2010/0274952 A1 | 10/2010 | Lee |
| 2011/0052196 A1 * | 3/2011 | Gnauck ................. H04B 10/50 398/79 |
| 2011/0072200 A1 | 3/2011 | Lee et al. |
| 2011/0125990 A1 | 5/2011 | Khosravi et al. |
| 2011/0170329 A1 | 7/2011 | Kang |
| 2011/0243552 A1 * | 10/2011 | Mitchell ............. H04J 14/0258 398/14 |
| 2012/0151294 A1 | 6/2012 | Yoo et al. |
| 2012/0243299 A1 | 9/2012 | Shau |
| 2012/0257459 A1 | 10/2012 | Berke |
| 2012/0297231 A1 | 11/2012 | Qawami et al. |
| 2013/0060996 A1 | 3/2013 | Berke |
| 2015/0172040 A1 * | 6/2015 | Pelekhaty ............. H04B 10/40 398/79 |
| 2016/0173221 A1 * | 6/2016 | Kato ...................... H04J 14/02 398/79 |

OTHER PUBLICATIONS

Office Action for U.S. Appl. No. 13/653,373, dated Mar. 27, 2014.
Notice of Allowance for U.S. Appl. No. 13/558,332, dated Feb. 25, 2014.
Office Action for U.S. Appl. No. 14/178,241, dated Jun. 27, 2014.
Office Action for U.S. Appl. No. 13/620,288, dated Oct. 1, 2013.
Office Action for U.S. Appl. No. 13/620,288, dated May 16, 2014.
Office Action for U.S. Appl. No. 13/791,807, dated May 29, 2014.
Office Action for U.S. Appl. No. 13/791,814, dated May 1, 2014.

* cited by examiner

Four sections per Colo & multiple colos (≥ 4) per data center

Interconnect Volume per section (except DCR to Metro)

| A End | Z End | Volume | Reach (max) | Medium | Cost Sensitivity | Market Space |
|---|---|---|---|---|---|---|
| Server* | TOR | 10k-100k | 3 m | Copper | Extreme | LAN |
| TOR | LEAF | 1k-10k | 20 m | Fiber(AOC) | High | |
| LEAF | SPINE | 1k-10k | 400 m | SMF | High | |
| SPINE | DCR | 100-1000 | 1000 m | SMF | Medium | Campus |
| DCR | Metro | 100-300 | 10-80km | SMF | Low | WAN |

\* Server to TOR links may be served by breakout cables

FIG. 2
(Prior Art)

|  |  | PRBS_En ||
|  |  | 0 | 1 |
| --- | --- | --- | --- |
| PAM_En | 0 | LPCDR Output 10/28 Gbaud NRZ | Hi Speed Clk < 50 Gbaud NRZ |
|  | 1 | LPCDR Output 10/28 Gbaud PAM 4 | Hi Speed Clk < 50 Gbaud PAM 4 |

FIG. 13

PAM 4 Encoding

| Bits | Section 1 | Section 2 | Section 3 |
|------|-----------|-----------|-----------|
| 00   | 000       | 000       | 000       |
| 01   | 001       | 001       | 001       |
| 11   | 011       | 011       | 011       |
| 10   | 111       | 111       | 111       |

FIG. 14

PAM 4 Encoder Logic

Binary to Gray/Thermometer encoding

| A | B | PAM symbol | X | Y | Z |
|---|---|---|---|---|---|
| 0 | 0 | 1 | 0 | 0 | 0 |
| 0 | 1 | 2 | 1 | 0 | 0 |
| 1 | 1 | 3 | 1 | 1 | 0 |
| 1 | 0 | 4 | 1 | 1 | 1 |

X = A or B

Y = A

Z = A and ~B

OPTICAL MODULE

CROSS-REFERENCE TO RELATED APPLICATIONS

This application is a continuation of and claims priority to U.S. application Ser. No. 16/431,492 filed Jun. 4, 2019, which is a continuation of U.S. application Ser. No. 16/034,668 filed Jul. 13, 2018, (now U.S. Pat. No. 10,355,804 issued Jul. 16, 2019) which is a continuation of and claims priority to U.S. application Ser. No. 15/694,472 filed Sep. 1, 2017 (now U.S. Pat. No. 10,050,736 issued Aug. 14, 2018), which is a continuation of and claims priority to U.S. application Ser. No. 15/375,031 filed Dec. 9, 2016 (now U.S. Pat. No. 9,787,423 issued Oct. 10, 2017), which is a continuation of U.S. application Ser. No. 14/625,489 filed Feb. 18, 2015 (now U.S. Pat. No. 9,553,670 issued Jan. 24, 2017), which claims priority to U.S. Provisional Application No. 61/947,374 filed Mar. 3, 2014, commonly assigned and incorporated by reference herein for all purposes.

BACKGROUND OF THE INVENTION

The present invention relates to telecommunication techniques. More particularly, the present invention provides an integrated apparatus with optical/electrical interfaces and protocol converter for telecommunication and methods.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Over the past, there have been many types of communication systems and methods. Unfortunately, they have been inadequate for various applications. Therefore, improved communication systems and methods are desired.

BRIEF SUMMARY OF THE INVENTION

The present invention relates to telecommunication techniques. More specifically, various embodiments of the present invention provide a communication interface that is configured to transfer data at high bandwidth over optical communication networks. In certain embodiments, the communication interface is used by various devices, such as spine switches and leaf switches, within a spine-leaf network architecture, which allows large amount of data to be shared among servers.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

Serial link performance is limited by the channel electrical bandwidth and the electronic components. In order to resolve the inter-symbol interference (ISI) problems caused by bandwidth limitations, we need to bring all electrical components as close as possible to reduce the distance or channel length among them. Stacking chips into so-called 3-D ICs promises a one-time boost in their capabilities, but it's very expensive. Another way to achieve this goal in this disclosure is to use multiple chip module technology.

In an example, an alternative method to increase the bandwidth is to move the optical devices close to electrical device. Silicon photonics is an important technology for moving optics closer to silicon. In this patent application, we will disclose a high speed electrical optics multiple chip module device to achieve terabits per second speed, as well as variations thereof.

In an example, the present invention provides an integrated apparatus for high speed telecommunication. The integrated apparatus includes a silicon photonics-based optical module configured to convert electrical signal into optical signal for 100 Gb/s or 400 Gb/s high-rate communication. The optical module is configured to output one or more optical signals with wavelengths in a course wave length division multiplex (CWDM) grid with 20 nm channel spacing, for example, a first laser with a first wave length having a peak of 1270 nm, a second laser having a second wave length having a peak at 1290 nm, a third laser with a third wave length having a peak at 1310 nm, and a fourth laser having a fourth wavelength having a peak at 1330 nm. The optical module is alternatively configured to output one or more channel wavelengths in a dense wave length division multiplex (DWDM) grid with peak wavelengths in a c-band ranging from 1525 to 1565 nm.

In an example, each of the laser devices included in the optical module for generating laser wavelength at either CWDM grid or DWDM grid is DFB characterized with a sufficiently low noise to meet a PAM N transmission over 100 km, whereupon N ranges from 2-8 (typically N=$2^n$, i.e., 2, 4, 8, etc.). In an example, each of the laser devices included in the optical module is characterized by a RIN (CNR)<−140 dB/Hz or better. In an example, each of the lasers is un-cooled or subject to cooling. If uncooled, it lowers power consumption, while leaving wavelength to "float" resulting in a lower spectral density. In another example, the optical module further comprises a TEC (thermoelectric cooler) to provide temperature stabilize for each of the lasers. In an example, each of the lasers is externally modulated using a Si Mach Zehnder modulator operating in a carrier depletion mode.

In an example, the optical module further comprises one or more high speed photodetectors made of germanium and integrated on a silicon substrate and coupled to an optical input port for detecting one or more incoming optical signals in the CWDM grid or DWDM grid. The silicon substrate comprises a fiber interface comprising a plurality of v-grooves, each of the v-grooves coupled to a mode adaptor. The photodetectors are configured to convert optical signals in the CWDM or DWDM grid to electrical currents that can be digitalized.

In an example, the silicon substrate comprises a separate path for a transmitter and a receiver. In an example, the silicon substrate comprises an interface configured with a single mode optical fiber. In an example, the laser light with each CWDM or DWDM grid wavelength is modulated with data, and processed into a single stream of information. In an example, the optical module further comprises a modulator configured for both NRZ and PAM4 modulation scheme. In another example, the optical module comprises a distributed modulator comprising a plurality of segments and a PAM4 coding is achieved via a thermometer coding. In yet another example, the NRZ modulation is achieved by driving all the segments together. In still another example, the distributed or segmented modulator is coupled to a limiting driver configured in CMOS. In yet still another example, the segmented modulator is configured with a segment length between 250 μm and 450 μm for minimal device parasitics and suitable for high speed operation.

In addition, the integrated apparatus further comprises a driver, which has a control block, an encoder, and a distributed MZM configuration. The driver comprises a parallel array of a plurality of amplifiers, each of which is optimized to drive a single segment of a modulator device in the optical module. In an example, the modulator device is coupled to the laser CWDM or DWDM grid using a flip chip configuration. In an example, the optical module has an optical input and an optical output. In an example, the integrated apparatus has a power supply, a microcontroller, and a transmit lane and a receive lane, the receive lane comprising a clock data recover device (CDR), forward error correction device (FEC), digital signal processor device (DSP), and a transimpedance amplifier (TIA). In an example, the transmit lane comprises a CDR, FEC, encoder device (ENC), and a driver (DRV). Further, the integrated apparatus has an electrical input interface and an electrical output interface, each of the interfaces is configured for either 4×10 Gb/s or 4×25 Gb/s. In another example, the optical module has a first multiplexer configured on the receive lane, and a second multiplexer configured on the transmit lane. In an example, the integrated apparatus is provided within a QSFP-28 package comprising a metal shield for electromagnetic radiation.

In a specific embodiment, the present invention provides an integrated apparatus with optical/electrical interfaces and protocol converter on a single silicon substrate. The apparatus includes an optical module comprising one or more modulators respectively coupled with one or more laser devices for producing a first optical signal to an optical interface. The optical module further includes one or more photodetectors for detecting a second optical signal from the optical interface to generate a current signal. Additionally, the apparatus includes a transmit lane module coupled between the optical module and an electrical interface. The transmit lane module includes at least a modulation driver configured to receive a first electric signal from the electrical interface and provide a framing protocol for driving the one or more modulators. Furthermore, the apparatus includes a receive lane module coupled between the optical module and the electrical interface. The receive lane module includes at least a transimpedance amplifier configured to process the current signal to send a second electric signal to the electrical interface. The first or second optical signal is associated with one or more wavelengths configured in a coarse wavelength division multiplex (CWDM) grid or a dense wavelength division multiplex (DWDM) grid.

The present invention achieves these benefits and others in the context of known memory technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 2 is a simplified diagram of a table illustrating interconnection volume per section for different distances ranging from 3 meters to 80 kilometers under the above cloud data center architecture.

FIG. 13 is a simplified diagram illustrating a preferred select table for modulation driver according to an embodiment of the present invention.

FIG. 14 is a simplified diagram illustrating PAM4 encoding scheme according to an embodiment of the present invention.

DETAILED DESCRIPTION OF THE INVENTION

Figure 1:
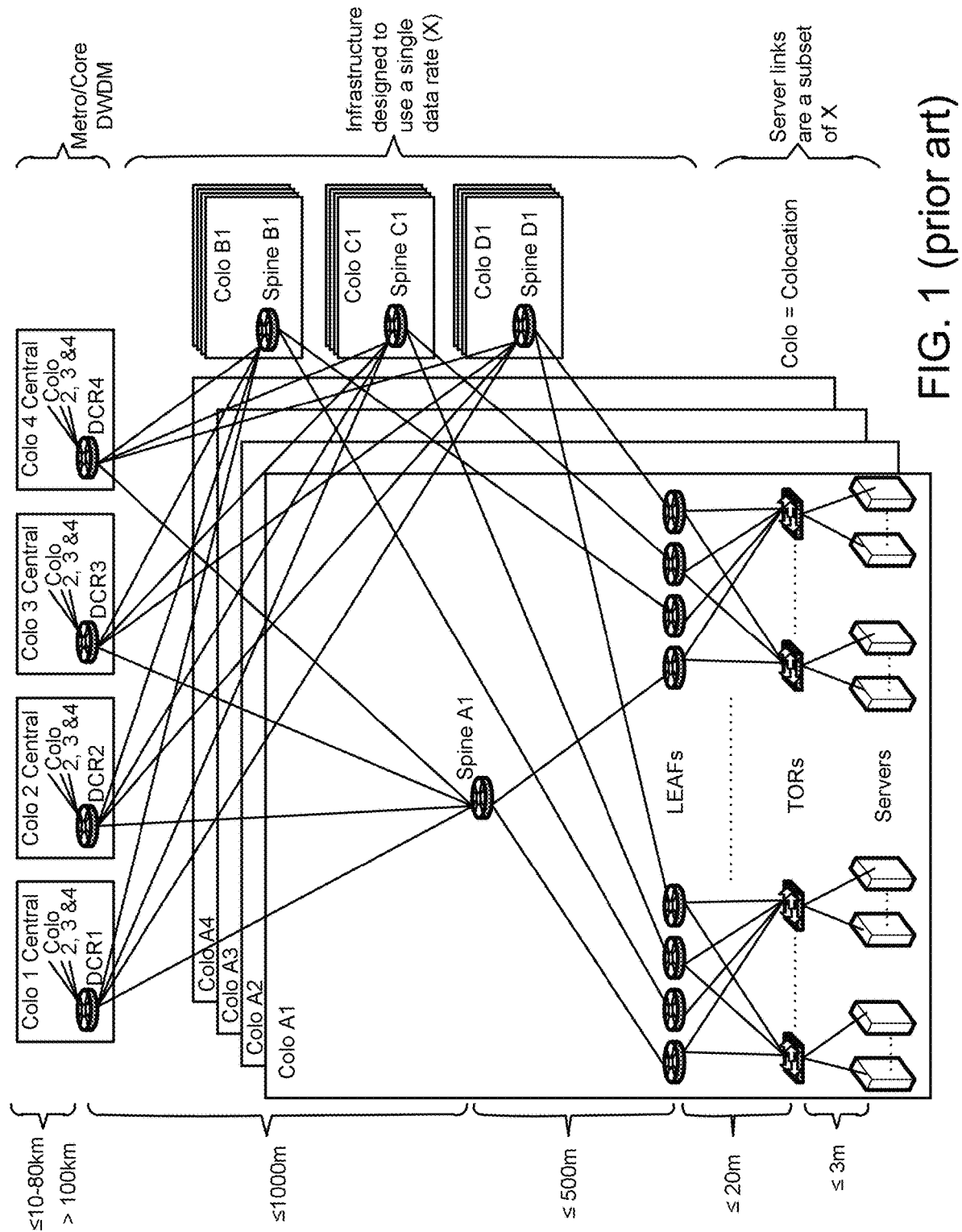
FIG. 1 is a simplified diagram illustrating cloud data center campus interconnections according to a prior art.

This present invention relates to telecommunication techniques. More specifically, various embodiments of the present invention provide an integrated apparatus with communication interface configured to transfer electrical data at high bandwidth over optical communication networks. In certain embodiments, the communication interface is used by various devices, such as spine switches and leaf switches, within a spine-leaf network architecture, which allows large amount of data to be shared among servers.

In the last decades, with advent of cloud computing and data center, the needs for network servers have evolved. For example, the three-level configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

Leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM4, PAM8, PAM12, PAM16, etc.) in leaf-spine architecture that allows large amount (up terabytes of data at the spine level) of data to be transferred via optical network.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram illustrating cloud data center campus interconnections according to a prior art. It is known, there is no single design or size for a cloud data center. Topologies of constructing such a data center continue to evolve with technology advancements and cost structures. Differences of the data center architecture design are driven by generation of design, location and scale. While the overall traffic flow within different data centers is similar the design differences drive different link requirements. Data center development and growth typically experience three phases including design, build-out and operational. Usually they are often in operational phase simultaneously with the build-out phase.

New co-location of a data center may come online as old one is being refreshed in three year cycle. Infrastructure should last at least 4-6 generations of refresh. New data centers and associated co-locations can be added to meet growing demand. For data center based on Optical Ethernet, inside the data center could be as far as 2 km. Data communication uses multi-mode fiber (MMF) with 1 to 40 Gigabit rate, though 100-400 Gigbit single-mode fiber (SMF) Ethernet transmission is possible. Outside the data center, 1 through 400 Gigbit SMF Ethernet is applicable for range from 2 to 10 km. Beyond data center topology, as shown in FIG. 1, it is a campus level where multiple data center collocations are interconnected in a leaf-spine network architecture connected by Metro DWDM for 10-80 km range and Core DWDM for >100 km range. For range less than 1000 m, each data center connects each node of four sections per one of multiple colocations via spine network up to 2 km range. Each co-location node per section further connects a plurality of ports via leaf network in less than 20 m range which connects many TOR ports supported by multiple Servers in 3 m range. The infrastructure is designed to use a single data rate (X) and the Server links are a subset of X. For example, X is 100 Gb/s, 400 Gb/s or higher.

FIG. 2 is a simplified diagram of a table illustrating interconnection volume per section for different distances ranging from 3 meters to 80 kilometers under the above cloud data center campus interconnection architecture. Each data center includes multiple co-locations and each co-location includes four sections. The table in FIG. 2 shows the interconnection volume from TOR to DC in the spine/leaf fiber network in which high cost sensitive market space on fiber-based high data-rate telecommunication apparatus is pictured. In particular, 100 Gb/s to 400 Gb/s apparatuses with integrated optical and electrical interfaces for communications of Long Reach (LR) leaf-to-spline, spine-to-DCR, and DCR-to-Metro using single-mode fiber connections are highly desired and will be described in more details below.

Figure 3:
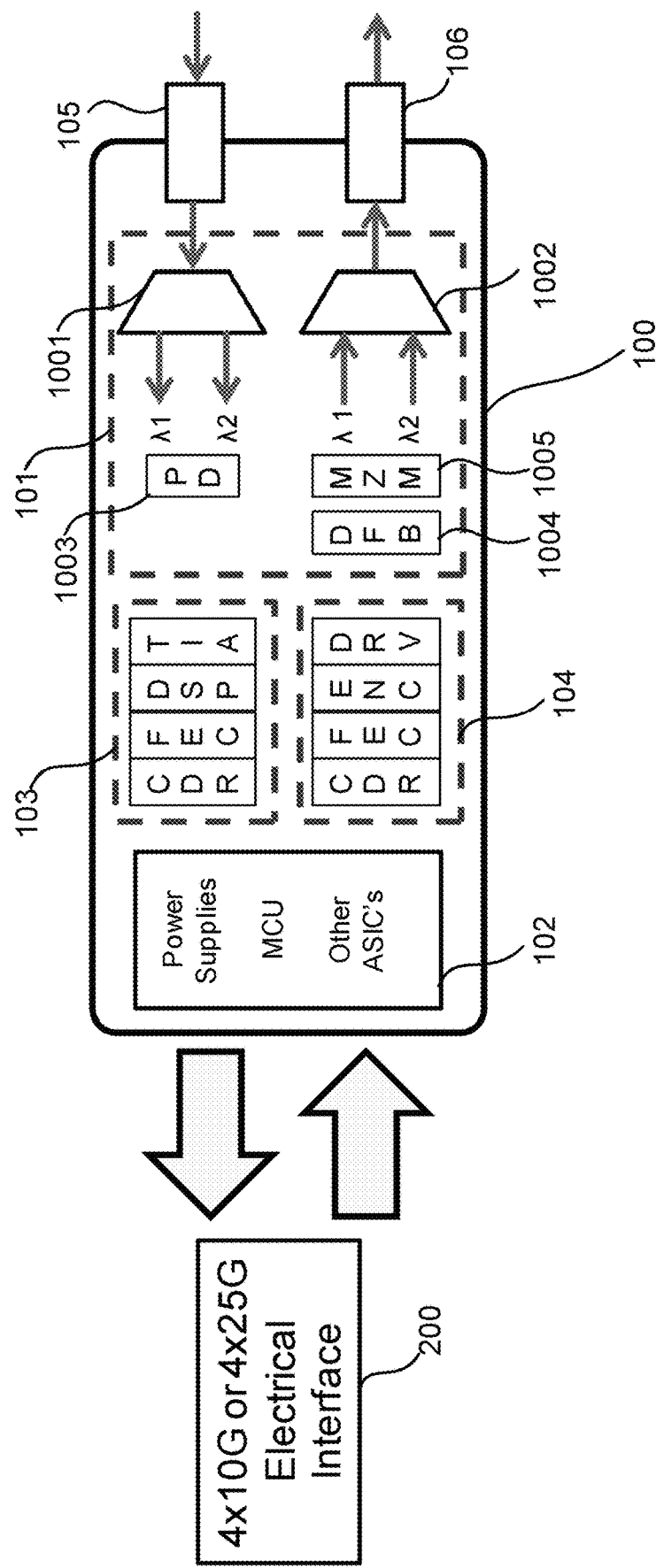
FIG. 3 is a simplified diagram of an integrated apparatus configured with electrical/optical interfaces for high data-rate telecommunication according to an embodiment of the present invention.

FIG. 3 is a simplified diagram of an integrated apparatus configured with electrical/optical interfaces and protocol converter for high data-rate telecommunication according to an embodiment of the present invention. This diagram is merely an example, which should not unduly limit the scope of the claims. One of ordinary skill in the art would recognize many variations, alternatives, and modifications. As shown, the integrated apparatus 100 is formed as a system-on-chip apparatus configured to convert electrical signal to optical signal or vise versa for high data-rate digital communication. The apparatus 100 includes a silicon-photonics optical module 101 having an optical interface with an input port 105 and an output port 106, a control module 102 with a power supply and a microcontroller or other ASIC circuits, and a transmit lane module 104 and a receive lane module 103. The optical module 101 includes a first multiplexer 1001 configured on the receive lane to receive a multiplexed optical signal from the input port 105 and to have multiple photo-detectors (PDs) 1003 to convert the de-multiplexed signals with different wavelengths into corresponding electrical current signals before sending to the receive lane module 103. In an embodiment, the first multiplexer 1001 is a silicon-based delay-line interferometer (DLI). In a specific embodiment, the DLI is configured to interleave a multiplexed light from one fiber into two waveguides each with a light in different wavelength. The optical module 101 further includes a second multiplexer 1002 configured on the transmit lane to couple multiple DFB lasers 1004 respectively modulated by MZ modulators (MZM) 1005 based on electrical signals received from and pre-processed by the transmit lane module 104. The second multiplexer 1002 is able to combine all optical signals and output it through the output port 106 to spline-leaf fiber network. In an embodiment, the second multiplexer 1002 is also a DLI served as a 2-to-1 power combiner to combined two lights in different wavelengths (for example, two channels in CWDM or DWDM grid with 50 GHz or 100 GHz spacing) into a multiplexed light for being transmitted through a single fiber. The receive lane module 103 comprises a clock data recover device (CDR), a forward error correction device (FEC), a digital signal processor device (DSP), and a transimpedance amplifier (TIA). The transmit lane module 104 comprises a CDR, a FEC, an encoder device (ENC), and a driver (DRV). Further, the integrated apparatus 100 is coupled with an electrical interface 200 having an input and an output configured for receiving or delivering Ethernet data with either 4×10 Gb/s or 4×25 Gb/s or higher data-rate. Based on the received electrical data, the DRV driver controls the DFB laser 1004 to generate a light with a certain wavelength and control the modulator 1005 for modulating the light from DFB laser 1004 to carry the data.

Figure 4A:
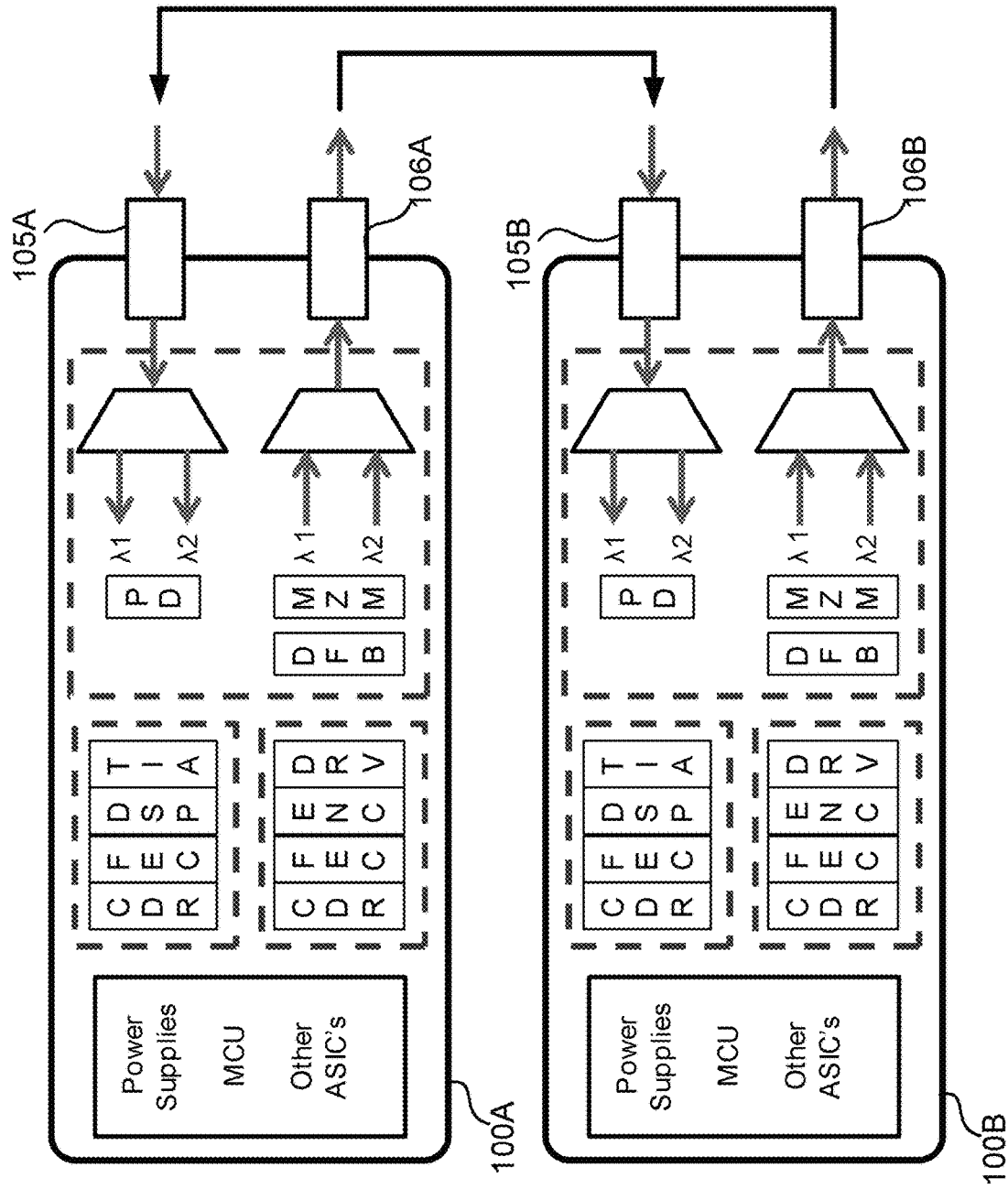
FIG. 4A is simplified diagrams of optical architecture of the integrated apparatus according to a first example of the present invention.

FIG. 4A is a simplified diagram of the integrated apparatus according to a first example of the present invention. This diagram is merely an example, which should not unduly limit the scope of the claims. One of ordinary skill in the art would recognize many variations, alternatives, and modifications. As shown, two integrated apparatuses 100A and 100B are respectively deployed at two end locations, or so-called A-end and Z-end corresponding to a leaf-to-spine (<400 m) or spine-to-DCR (<1000 m) fiber network. In the example, each integrated apparatus 100A or 100B is substantially the same as apparatus 100 depending on specific configurations for matching particular data rate and framing protocol format. In an embodiment, FIG. 4A illustrate an optical architecture in which an output port 106A of the integrated apparatus 100A at the A-end is directly connected to an input port 105B of another integrated apparatus 100B at the Z-end without need of an optical amplifier (OA). The electrical input signals with 40 Gb/s (or 100 Gb/s rate) can be categorized to 4×10 Gbit/s (or 4×25 Gbit/s) using the integrated apparatus (100A or 100B) to convert the electrical signals to 4λ, or 2λ optical signals in a NRZ or PAM4 encoding scheme. Correspondingly, the optical signals are categorized to either 2λ×22.5 Gbaud (or 1λ×22.5 Gbaud) for 4×10 Gbit/s rate and 4λ×28.125 Gbaud (or 2λ×28.125 Gbaud) for 4×25 Gbit/s rate.

The integrated apparatus 100A or 100B includes one up to 4 DFB laser(s) (though only two wavelengths are shown in FIG. 4A) associated with a silicon-photonics based optical module for generating optical signals bearing up to four wavelengths in CWDM grid around 1300 nm with 20 nm channel spacing. The optical signals are needed to only travel a distance less than 2 km. In an embodiment, in association with the receive lane of the optical module, a first multiplexer is included for interleave light from a single fiber to two paths with different wavelength. While in associated with the transmit lane of the optical module, a second multiplexer is configured to be a 2-to-1 power combiner for combining lights generated by two DFB lasers at two wavelengths into one fiber. Each of the first multiplexer and the second multiplexer can be made of a delay-line interferometer while operated with light traveling in opposite direction.

In an example, each of the laser devices included in the optical module for generating laser wavelength at either CWDM grid or DWDM grid is DFB characterized with a sufficiently low noise to meet a PAM N transmission over 100 km, whereupon N ranges from 2-8 (typically N=$2^n$, i.e., 2, 4, 8, etc.). In an example, each of the laser devices included in the optical module is characterized by a RIN (CNR)<−140 dB/Hz. In an example, each of the lasers is un-cooled or subject to cooling. If it is uncooled, it lowers power consumption, while leaving wavelength to "float" in association with a lower spectral density. In another example, the optical module further comprises a TEC (thermoelectric cooler) to provide temperature stabilize for each of the lasers. In an example, each of the lasers is externally modulated using a Si Mach Zehnder modulator operating in a carrier depletion mode.

Figure 4B:
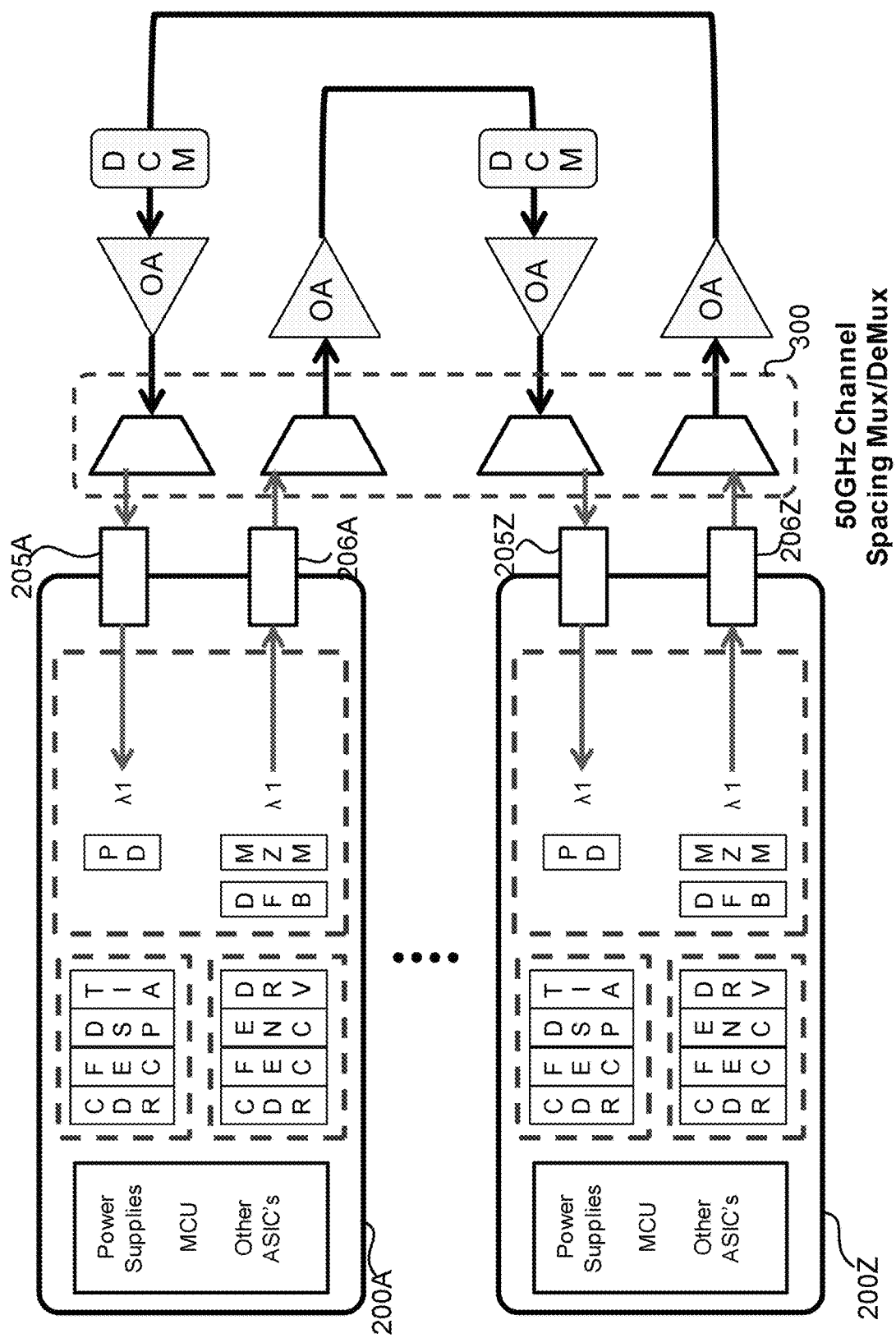
FIG. 4B is simplified diagrams of optical architecture of the integrated apparatus according to a second example of the present invention.

FIG. 4B is a simplified diagram of the integrated apparatus according to a second example of the present invention. This diagram is merely an example, which should not unduly limit the scope of the claims. One of ordinary skill in the art would recognize many variations, alternatives, and modifications. As shown, in a second example of optical architecture, two integrated apparatuses 200A and 200Z are deployed pair-wisely at an A-end and a Z-end of a DCR-to-Metro fiber network to provide data communication with rate of 40 Gbit/s using a single wavelength at DWDM grid generated by a DFB laser. The apparatus 200A/200Z at the A/Z-end of the DCR-to-Metro fiber network includes an optical module having an output/input port 206A/205Z for transmitting/receiving a single wavelength (1λ) light carrying data to/from an input/output port 205Z/206A the paired apparatus 200Z/200A at Z/A-end of the network. No multiplexer is needed within the optical module of the integrated apparatus 200A or 200Z.

From one data center, multiple paths can be deployed from this data center to multiple destination in the DCR-to-Metro network. Thus, multiple integrated apparatuses, all in pair-wise manner like 200A and 200Z, can be deployed at corresponding A-end and Z-end of respectively paths. An optical module of each integrated apparatus at either A or Z-end is equipped with a single DFB laser for generating respective channel wavelength in the DWDM grid. For example, the channel wavelength can be one selected from all C-band wavelengths having channel spacing of 50 GHz.

From a transmission end of the DCR-to-Metro network, the laser light at each channel wavelength is modulated into a specific optical signal based on an electrical input signal by a MZ modulator. In an embodiment, PAM4 encoding is used for converting the electrical signal of 40 Gbit/s to an 1λ-20 Gbaud optical signal carried by a single-wavelength light. The MZ modulator (MZM) is built in the optical module of each integrated apparatus (200A or 200Z) and outputted through the corresponding output port (e.g., 206A or 206Z) regardless that the integrated apparatus is deployed at A-end or Z-end. Each MZ modulators is a Si Mach Zehnder modulator operated in a carrier depletion mode. All these individual single-wavelength lights are combined by a DWDM MUX device 300 with 50 GHz channel spacing to a single fiber before being transmitted via the network over distances larger than 10 km. In an embodiment, the DWDM MUX device 300 is able to multiplex up to 96 channels of wavelengths in a DWDM grid with 50 GHz channel spacing. In certain embodiments, optical amplifier (OA) and dispersion compensation module (DCM) may be needed for retaining data integrity. Other functionalities of each integrated apparatus associated with transmit lane are substantially similar to what have been described for the integrated apparatus 100.

From a receiving end of the DCR-to-Metro network, a 50 GHZ channel spacing DEMUX device 300 is configured to de-multiplex an incoming optical signal received from the transmission end to multiple individual lights with respective single wavelength (1λ) at a DWDM grid with 50 GHz channel spacing. Then each single wavelength light carrying corresponding modulated data is received via a corresponding input port (205A or 205Z) of the optical module (without being equipped a multiplexer in either receiver) of the corresponding integrated apparatus (200A or 200Z). The data carried by the single wavelength light is detected by a photodetector (PD) therein and further converted to an electrical signal. Other functionalities of each integrated apparatus associated with receive lane for processing the above converted electrical signal are substantially similar to what have been described for the integrated apparatus 100.

In an example, each of the laser devices included in the optical module is characterized with a sufficiently low noise to meet a PAM N transmission over 100 km, whereupon N ranges from 2-8 (typically N=$2^n$, i.e., 2, 4, 8, etc.). In an example, each of the laser devices included in the optical module is characterized by a RIN (CNR)<−140 dB/Hz. In an example, each of the lasers is un-cooled or subject to cooling. If uncooled, it lowers power consumption, while leaving wavelength to "float" in association with a lower spectral density. In another example, the optical module further comprises a TEC (thermoelectric cooler) to provide temperature stabilize for each of the lasers. In an example, each of the lasers is externally modulated using a Si Mach Zehnder modulator operating in a carrier depletion mode.

Figure 5:
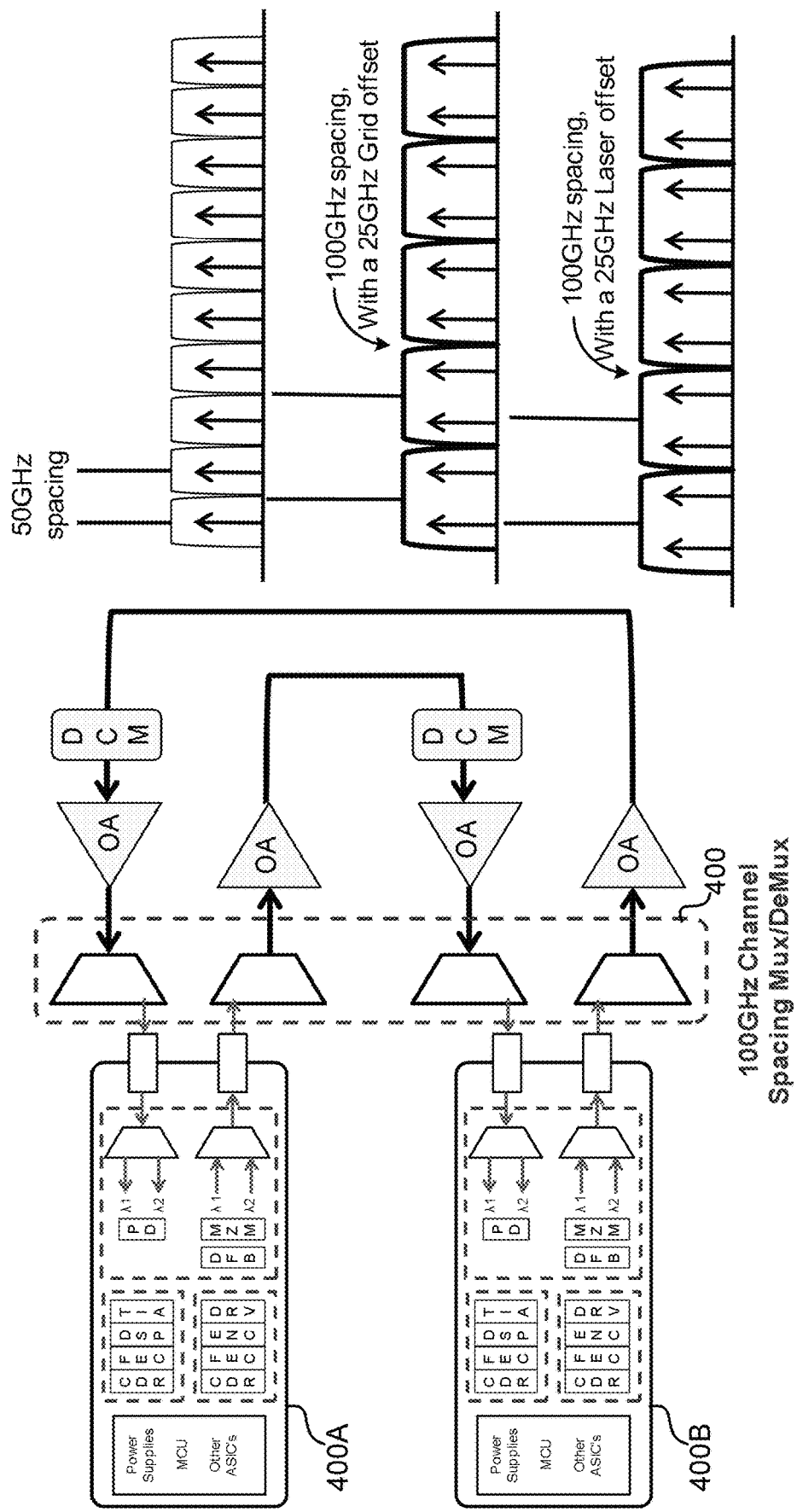
FIG. 5 is a simplified diagram of optical architecture of the integrated apparatus according to a third example of the present invention.

FIG. 5 is a simplified diagram of the integrated apparatus according to a third example of the present invention. This diagram is merely an example, which should not unduly limit the scope of the claims. One of ordinary skill in the art would recognize many variations, alternatives, and modifications. As shown, it is a scenario for transmitting 100 Gbit/s DWDM optical signal with 28.125 GBaud under a dual wavelength (2λ) PAM4 encoding in DCR-to-Metro network. Similar to the scenario shown in FIG. 4B, two integrated apparatus 400A and 400Z are deployed at both A-end and Z-end of one path of DCR-to-Metro network.

In a specific embodiment, each apparatus, 400A or 400Z, unlike that only one DFB laser is included in each apparatus in FIG. 4B but a 50 GHz DWDM MUX device 300 must be required for combining multiple channels with 50 GHz spacing, is configured to include two DFB lasers respectively set at two wavelengths (2λ) having 50 GHz spacing but respectively shifted 25 GHz apart from a standard DWDM grid with 100 GHz spacing. A DLI-based multiplexer in the optical module of the integrated apparatus 400A or 400B first combines the modulated lights generated from two DFB lasers to one output port as a 2λ optical signal. When multiple integrated apparatuses similar to 400A or 400B are added for providing additional 2λ optical signals, each of those additional channel wavelengths can be properly selected from DWDM grid with 50 GHz spacing and configured to have center wavelength of each 2λ optical signal outputted from one integrated module is 100 GHz apart from that of a nearest neighbor 2λ optical signal outputted from another integrated module of the same kind. When all these 2λ optical signals are combined, it is able to provide all (up to 96) channels with 50 GHz spacing. With such optical architecture, a common 100 GHz MUX device 400, instead of more expensive 50 GHz multiplexer, is enough to provide all required 50 GHz spacing channels for transmitting data through the DCR-to-Metro network for 40 Gbit/s or 100 Gbit/s system.

Figure 6:
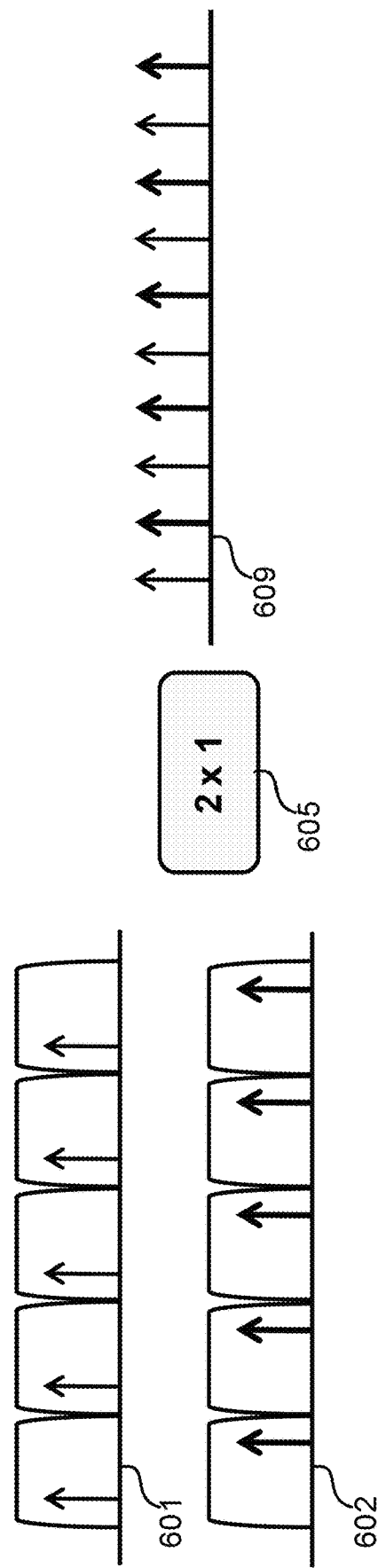
FIG. 6 is a simplified diagram of using a 2-to-1 power combiner for combining two 100 GHz grid to create a 50 GHz grid according to an embodiment of the present invention.

FIG. 6 is a simplified diagram of using a 2-to-1 power combiner for combining two 100 GHz grid to create a 50 GHz grid according to an embodiment of the present invention. This diagram is merely an example, which should not unduly limit the scope of the claims. One of ordinary skill in the art would recognize many variations, alternatives, and modifications. In general, in the embodiments shown in previous figures (FIGS. 4A, 4B, and 5), it requires a 50 GHz multiplexer for the 40 Gbit/s system and a 100 GHz multiplexer for the 100 Gbit/s system. In an alternative embodiment, as shown in FIG. 6, to create a 50 GHz grid 609 (for the 40 Gbit/s system) from two 100 GHz grids 601 and 602 a 2-to-1 power combiner 605, e.g, the DLI in the optical module, to interleavely combine two sets of channels from two 100 GHz multiplexers. Each 100 GHz multiplexer (601 or 602) combines a set of 100 GHz spacing channels and each channel of one set is 50 GHz apart from a corresponding channel in another set. The trade-off for replacing the 50 GHz multiplexer with 100 GHz multiplexer is that additional 3 dB gain is required from the optical amplifier in the same optical path.

Figure 7:
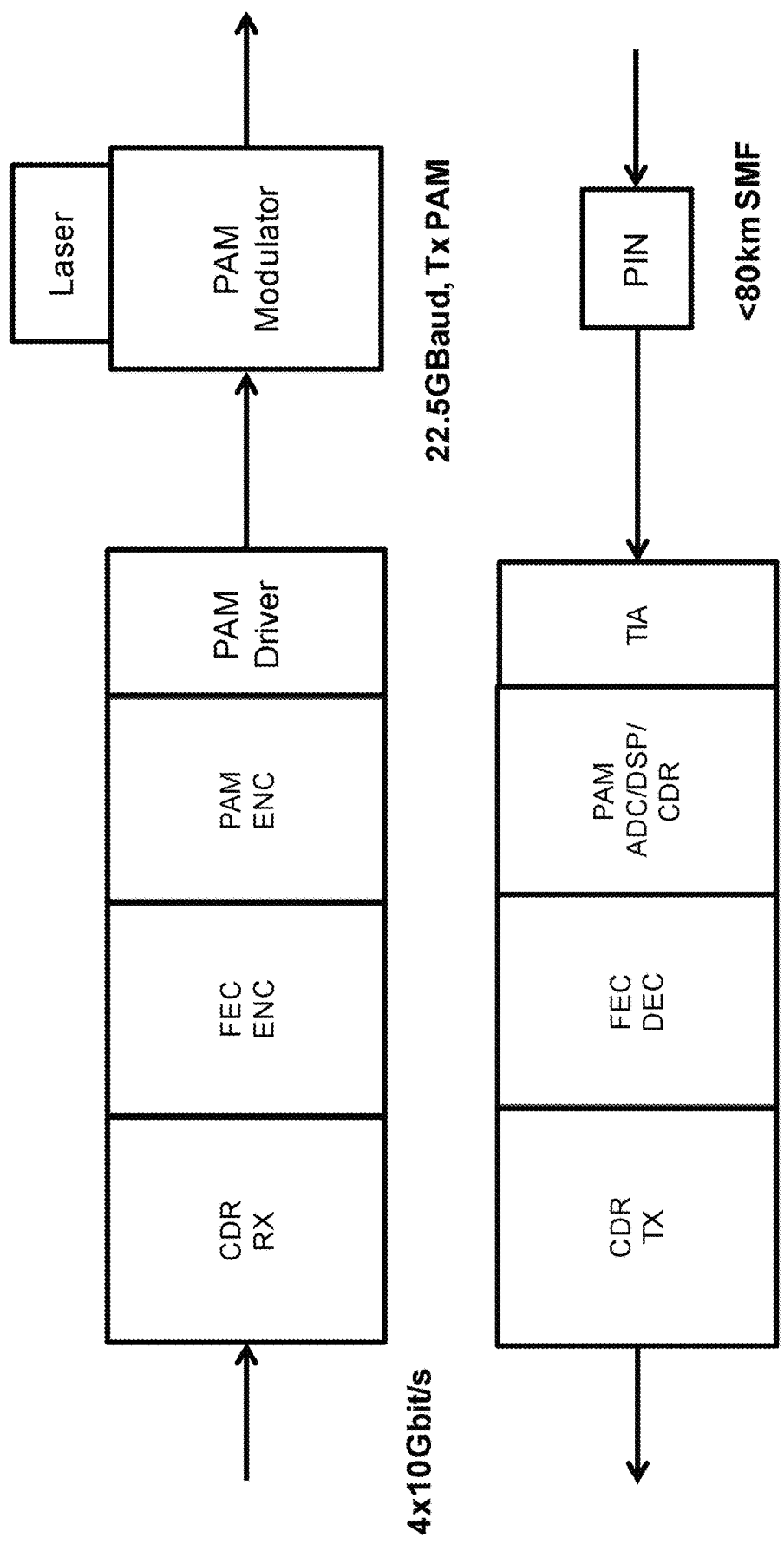
FIG. 7 is a simplified diagram illustrating an example of 40 Gbit/s PAM4 encoding implemented in the integrated apparatus according to an embodiment of the present invention.

FIG. 7 is a simplified diagram illustrating an example of 40 Gbit/s PAM4 encoding implemented in the integrated apparatus according to an embodiment of the present invention. This diagram is merely an example, which should not unduly limit the scope of the claims. One of ordinary skill in the art would recognize many variations, alternatives, and modifications. As shown, 40 Gbit/s PAM4 encoding is implemented in the transmit lane module by using PAM encoder to couple with a FEC encoder to handle an electrical signal received via a Rx-CDR from an electrical interface through, e.g., a 4×10 G Quad Small Form-factor Pluggable (QSFP) compact, hot-pluggable format. The PAM encoder further couples with a PAM driver in the transmit lane module for providing control of a PAM-based MZ modulator associated with a single DFB laser in the optical module. The PAM4 encoding is implemented to driver the DFB laser to generate an laser light modulated by the MZ modulator such that a 4×10 Gibt/s rate electrical signal can be converted to a 22.5 GBaud optical signal at the output port of the optical module, thereby enabling 40 Gbit/s rate transmission over one of four CWDM channels or up to 96 DWDM grid channels with 50 GHz channel spacing.

In the same integrated module, as shown in FIG. 7, the PAM encoding is also implemented in association with the receive lane module. When the PIN photo detector receives the optical signal from a single-mode fiber (after <80 km transmission), the optical signal is converted to an electric current that is amplified by a transimpedance amplifier (TIA). Then PAM-enabled analog to digital converter (ADC) converts the analog current signal to digital signal which is processed with PAM-enabled encoding algorithm by a digital signal processor (DSP). Following that, the digital signal is further processed by a clock and data recovery device (CDR) to remove the jitter inherited from the high data rate system. A FEC decoder with 7.5 dB coding gain is applied for decoding forward error correction code associated with the signal. A Tx-CDR then is used for processing the signal before sending out through the electrical interface in QSFP format.

Figure 8:
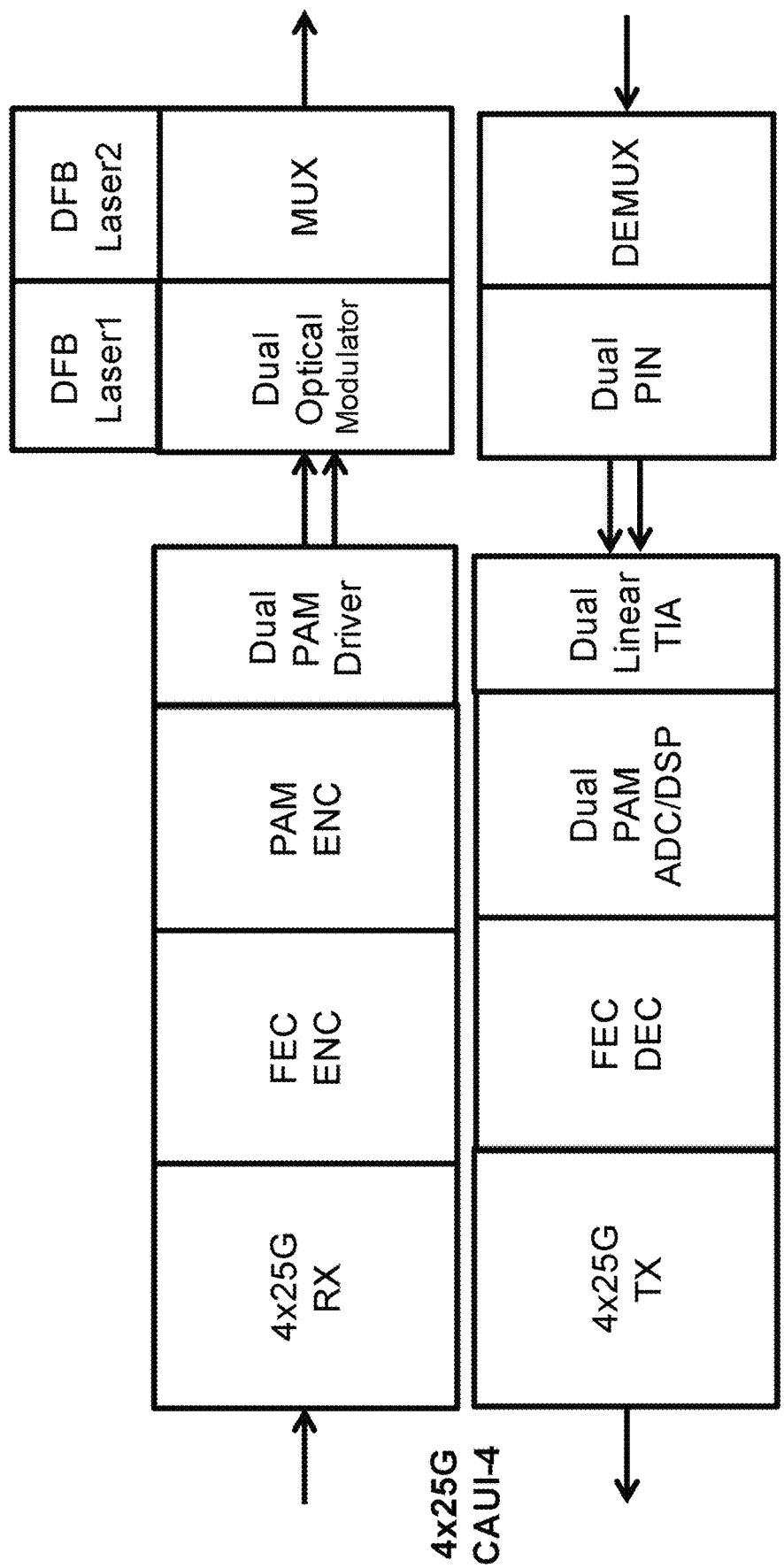
FIG. 8 is a simplified diagram illustrating an example of 100 Gbit/s PAM4 encoding implemented in the integrated apparatus according to an embodiment of the present invention.

FIG. 8 is a simplified diagram illustrating an example of 100 Gbit/s PAM4 encoding implemented in the integrated apparatus according to an embodiment of the present invention. This diagram is merely an example, which should not unduly limit the scope of the claims. One of ordinary skill in the art would recognize many variations, alternatives, and modifications. As shown, for a 100 Gb/s data rate system, PAM4 encoding implementation needs two wavelengths (2λ) in optical mode for transmitting 28.125 GBaud signal with 50 Gb/s per wavelength. Accordingly, a dual PAM driver is used in the transmit lane module to drive two DFB lasers in the optical module to generate two lights which are respectively modulated by a dual MZ modulator based on PAM4 encoding protocol to convert the corresponding electric signals received from an electrical interface in 4×25 G CAUI-4 format. The electric signals also are processed by FEC encoder and PAM-enabled encoder before being converted to optical signals. In addition, to handle the 2λ optical signals a MUX device is added to the optical module for combining two lights into one and outputting to a single fiber. In a specific embodiment, 28.125 GBaud PAM4 encoding implemented in the integrated apparatus enables 100 Gbit/s data rate optical transmission over one of 4 CWDM channels or 40 DWDM channels with 100 GHz spacing.

Similarly, in the receive lane a DEMUX is firstly needed to interleave the optical signal from the single fiber back to two separate lights with corresponding channel wavelengths carrying the PAM4 mode signal. Accordingly, a dual PIN photo detector is used to separately detect the two lights with different wavelengths and respectively convert to two current signals. In the receive lane module, a dual linear TIA and dual PAM-enabled ADC/DSP device are implemented for processing the current signal and generating a corresponding digital signal. Subsequently, a FEC device is configured to decode the signal and perform forward error correction. Finally, a properly formatted electric signal is transmitted out in 4×25 Gb/s rate via the electrical interface.

Figure 9:
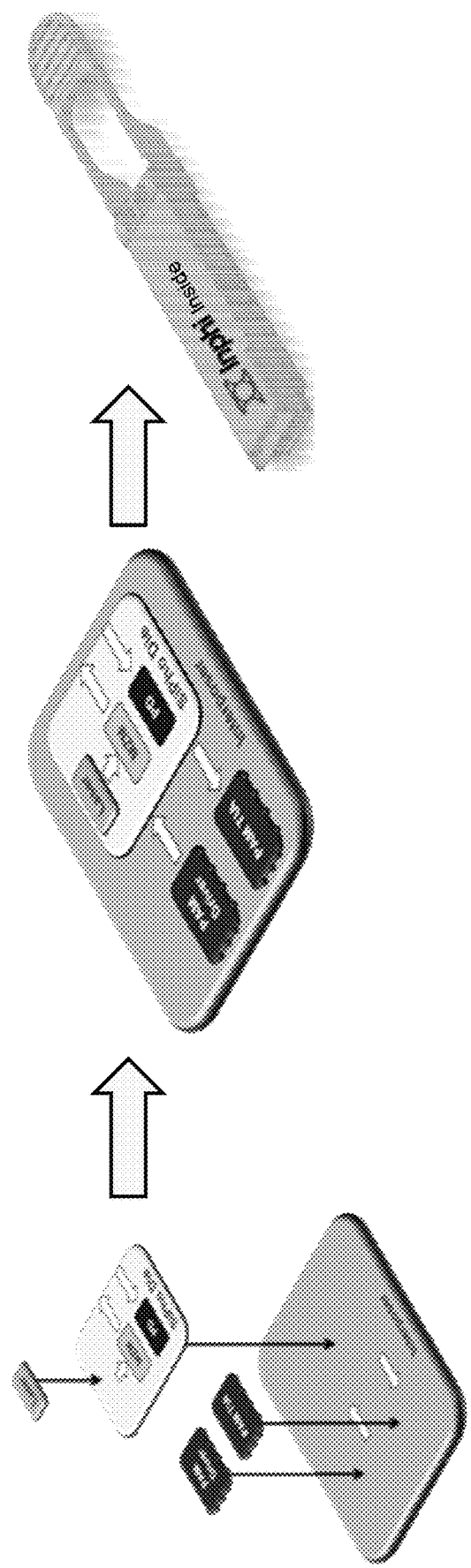
FIG. 9 is a simplified block diagram of packing the integrated apparatus for high data-rate telecommunication according to an embodiment of the present invention.

FIG. 9 is a simplified block diagram of packing the integrated apparatus including 100 G to 400 G silicon photonics chip development for high data-rate telecommunication according to an embodiment of the present invention. This diagram is merely an example, which should not unduly limit the scope of the claims. One of ordinary skill in the art would recognize many variations, alternatives, and modifications. As shown, the integrated apparatus is configured to be packaged on a single substrate or interposer including a silicon photonics optical module and a receive lane module plus a transmit lane module. The silicon photonics optical module is packaged in a SiPho die including built-in DFB lasers to provide up to 4 laser lights with corresponding channel wavelengths selected for implementing either NRZ or PAM4 encoding protocol electrical/optical signal conversion. The optical signals are modulated by internal multi-segmented MZMs for transmission to an optical output port via a fiber-interface. Conversely, an optical input port associated with the fiber-interface is configured to receive the optical signal and have it detected by built-in photodetector (PD) per wavelength. The PDs are made of germanium and integrated onto the SiPho die directly. The fiber-interface comprises a plurality of v-grooves, each of the v-grooves being coupled to a mode adaptor. The receive lane module includes at least a PAM driver configured to drive the DFB laser inside the optical module. The transmit lane module includes at least a PAM-enabled TIA for processing the received analog current signal converted by the PD per wavelength.

In a specific embodiment, the integrated apparatus is packaged with a QSFP format interface with 28 pins capable of handling 4 wavelengths optical signal transmission with 28 GBaud rate for 100 G system. It is further upgradable to handle 4 wavelengths optical transmission with 56 GBaud rate for 400 G system. The MZMs in the optical module and PAM driver in the transmit lane module are capable of operating in both NRZ and PAM4 encoding protocol for converting electrical signal to optical signal at any selected wavelength in either a CWDM channel or a DWDM 50 GHz grid channel. The driver and TIA are made from 28 nm CMOS based technology and still upgradable.

Figure 10:
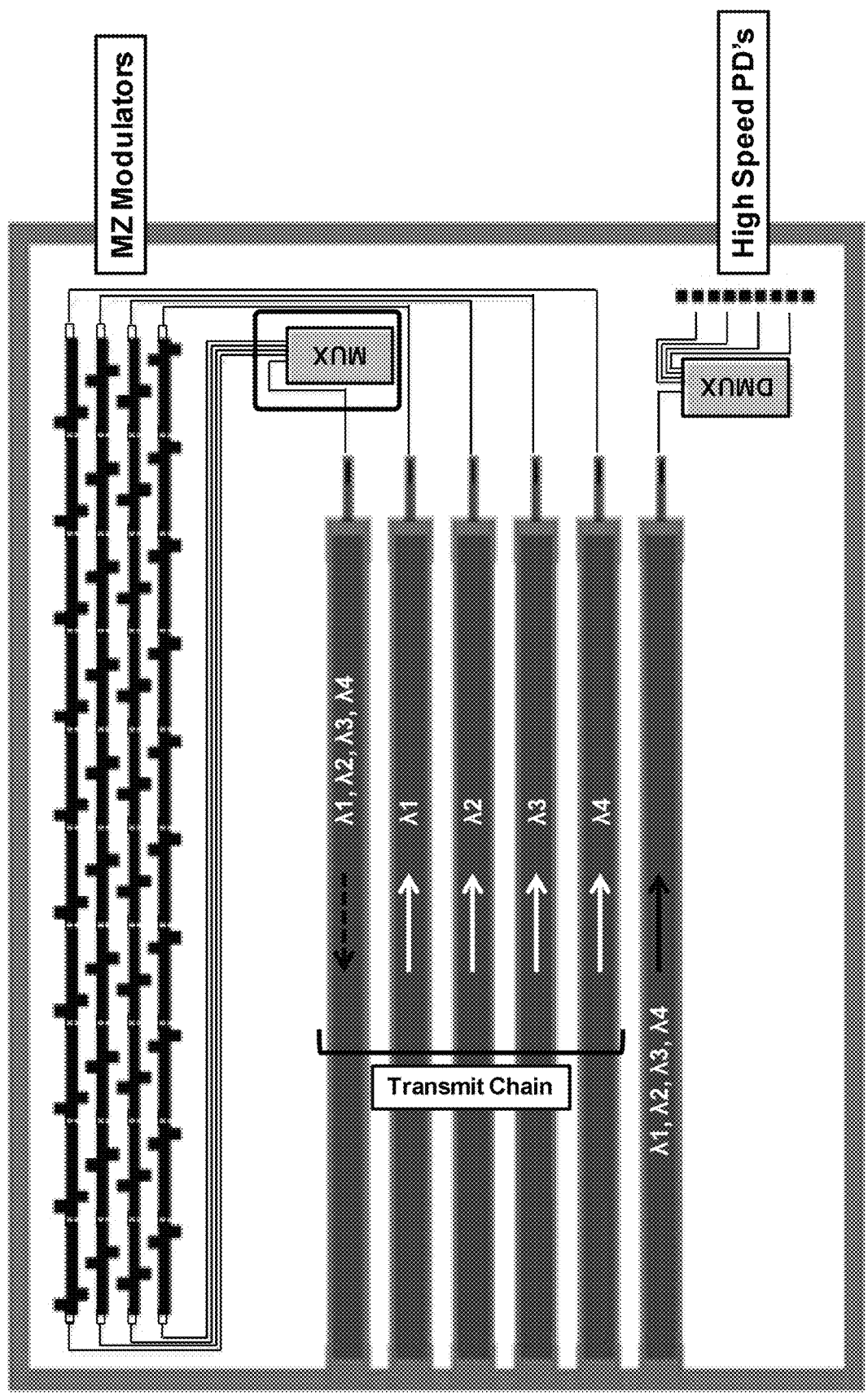
FIG. 10 is a simplified diagram illustrating a silicon photonics optical module chip layout according to an embodiment of the present invention.

FIG. 10 is a simplified diagram illustrating a silicon photonics optical module chip layout according to an embodiment of the present invention. This diagram is merely an example, which should not unduly limit the scope of the claims. One of ordinary skill in the art would recognize many variations, alternatives, and modifications. As shown, up to 4 laser devices configured to generate four lights with corresponding wavelength λ1, λ2, λ3, and λ4 are laid in the central region occupying major area of the module. Each light with corresponding wavelength is guided through separate Si-based waveguides to a corresponding Si-based MZ linear segmented modulator. The modulated light signal is then multiplexed by a MUX device and sent to a single transmit waveguide with all four wavelengths. The transmit waveguide is configured to couple with a single fiber for optical transmission. Separately, a receiving waveguide is configured to couple with a single fiber to receive an optical signal carrying four wavelengths, λ1, λ2, λ3, and λ4. A DEMUX device is implemented to de-multiplex the received optical signal into four individual lights with corresponding wavelength λ1, λ2, λ3, and λ4 which are respectively detected by four high-speed photodetectors (PDs).

Figure 11:
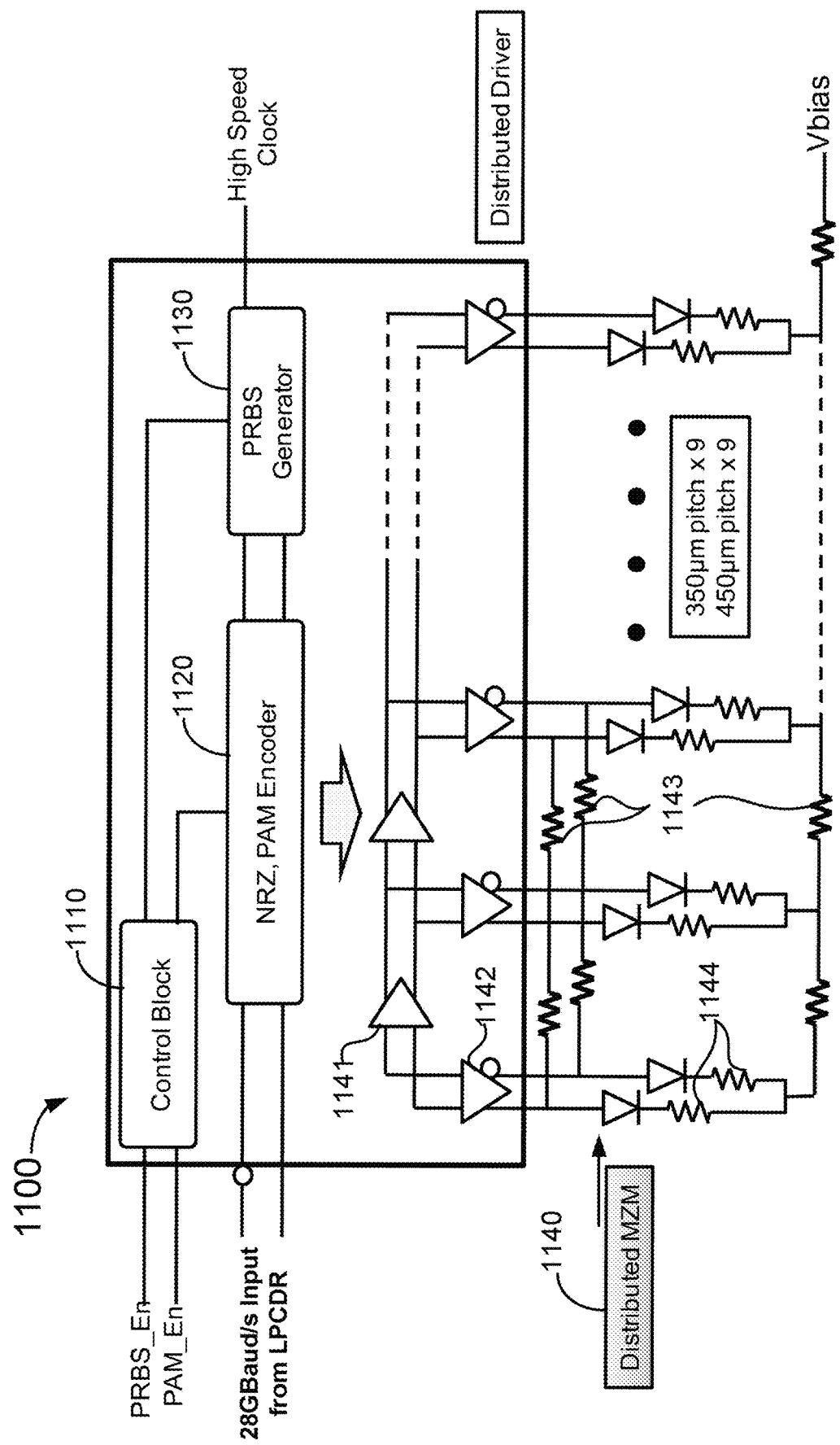
FIG. 11 is a simplified diagram of a modulation driver device according to an embodiment of the present invention.

FIG. 11 is a simplified diagram of a modulation driver device according to an embodiment of the present invention. This diagram is merely an example, which should not unduly limit the scope of the claims. One of ordinary skill in the art would recognize many variations, alternatives, and modifications. As shown, a modulation driver device 1100 includes a control block 1110, an encoder 1120, a pseudo random binary sequence (PRBS) signal generator 1130, and a distributed MZM configuration 1140. In particular, the control block 1110 is configured to receive a pair of PAM_En code and PRBS_En code from a binary select table to respectively operate the (PAM or NRZ) encoder 1120 and the PRBS signal generator 1130 in a corresponding mode. The PAM encoder 1120 is configured to directly couples with the distributed MZM configuration 1140 for controlling a MZ modulator inside the optical module of the integrated apparatus to provide modulation based on received 28 Gbit/s CDR-processed electric signal using PAM4 (or NRZ) encoding to a laser light generated by a DFB laser device.

The MZ modulator is substantially similar to one shown in FIG. 10 as a segmented modulator. The PRBS generator 1130 is to supply a known binary sequence used as a test high-speed clock signal when making bit error rate measurements. With the distributed MZM configuration 1140 the driver device 1100 is a distributed driver comprising a parallel array of a plurality of amplifier units 1141/1142 having a common bias voltage Vbias, each of which is optimized to drive a single segment of a modulator in the optical module. In an implementation, each segment is subjected to about 0.5MΩ-1.0MΩ electrical isolation 1143 from its neighbor due to about 10 μm~20 μm pitch distance. Each segment itself includes a serial resistance 1144 of about 3Ω~4Ω or induction 120 fF~160 fF due to segment length ranging from 350 μm~450 μm. In an example, assuming that there are 9 segments in a MZ modulator, correspondingly the distributed MZM driver configuration 1140 has 9 amplifier units 1141/1142 with an isolation 1143 per pitch and a serial resistance 1144 properly set for respectively driving each segment of the MZ modulator.

Figure 12:
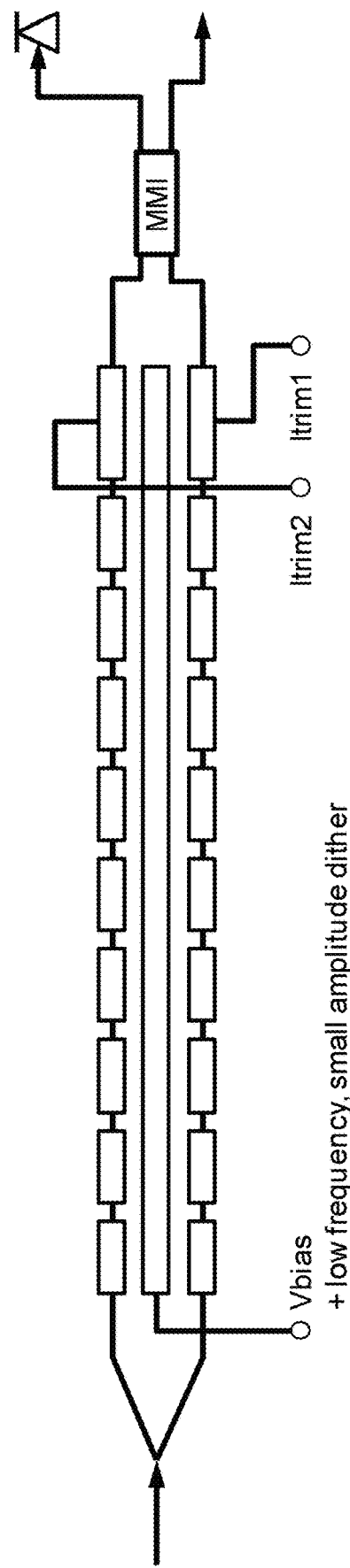
FIG. 12 is a simplified diagram illustrating a control scheme of MZ modulator according to an embodiment of the present invention.

FIG. 12 is a simplified diagram illustrating a control scheme for MZ modulator according to an embodiment of the present invention. This diagram is merely an example, which should not unduly limit the scope of the claims. One of ordinary skill in the art would recognize many variations, alternatives, and modifications. As shown, the MZ modulator is a multi-segment modulator so that a distributed MZM control configuration is used to set the MZ modulator bias at an ideal position on Quadrature transfer curve. In particular, a middle electrode is applied Vbias including a low frequency small amplitude dither signal and two side electrodes (per segment) are respectively set as a positive and a negative electrode for a pair of p-n junctions such that the phases at the two arms (per segment) of the MZ modulator is just opposite to create a proper signal modulation. A forward biased section with Itrim1 and Itrim2 on both arms is used to determine a base value of Vbias for the MZM. The dither signal is used along with the Vbias for tuning the modulation such that when the dither signal is detected using a PD integrated with one of the arms the Vbias is tuned to minimize the dither signal at the output for locking the Vbias under a scheme of the Quadrature transfer curve.

FIG. 13 is a simplified diagram illustrating a preferred select table for modulation driver according to an embodiment of the present invention. This diagram is merely an example, which should not unduly limit the scope of the claims. One of ordinary skill in the art would recognize many variations, alternatives, and modifications. As shown, a select table for both binary codes of PAM-En and PRBS_En is presented. Each of PAM_En and PRBS_En is selected from "0" or "1". In an embodiment, for PAM_En=PRBS_En=0, a scheme with low-pass CDR output for 10 to 28 GBaud/s electrical/optical signal conversion in NRZ encoding is selected. In another embodiment, for PAM_En=0, PRBS_En=1, a scheme with high speed clock signal accompanying a <50 GBaud/s electrical/optical signal conversion in NRZ encoding is selected. In yet another embodiment, for PAM_En=1, PRBS_En=0, a scheme with low-pass CDR output for 10 to 28 GBaud/s electrical/optical signal protocol conversion in PAM4 encoding is selected. In still another embodiment, for PAM_En=PRBS_En=1, a scheme with high speed clock signal accompanying a <50 GBaud/s electrical/optical signal conversion in PAM4 encoding is selected.

FIG. 14 is a simplified diagram illustrating PAM4 encoding scheme according to an embodiment of the present invention. This diagram is merely an example, which should not unduly limit the scope of the claims. One of ordinary skill in the art would recognize many variations, alternatives, and modifications. As shown, a PAM4 encoding scheme is proposed for mapping binary coded bit to Gray/thermometer code via the segmented MZM sections. Assuming 9 equal thermometer coded MZM sections, the thermometer drives equally weighted segmented MZ interferometer drivers. For PAM4 signaling in the MZ interferometer driver, there are four levels of optical output, representing two binary coded bits: one LSB bit and one MSB bit, providing $2^2=4$ combination states of 0 and 1, e.g., 00, 01, 11, and 10. The Gray/Thermometer coding provides better performance than binary weighting. As shown, minimum 3 MZM sections are needed for mapping the two binary bits with four states into corresponding four thermometer codes of 000, 001, 011, and 111. But the 9 equal thermometer coded MZM sections can be grouped into 3 sections to minimize device parasitics.

Figure 15:
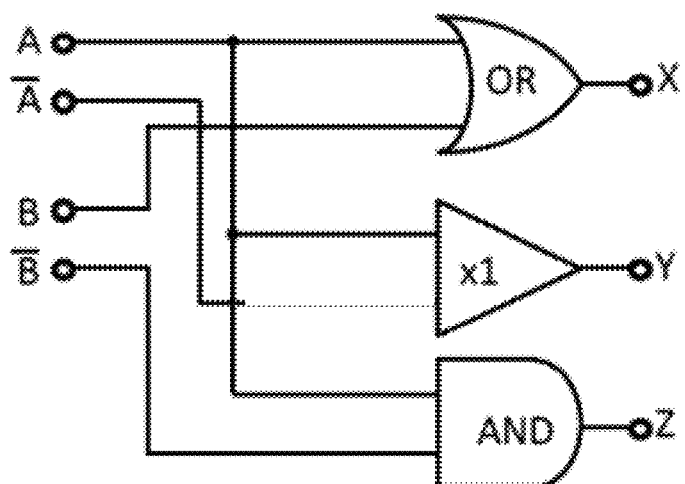
FIG. 15 is a simplified block diagram illustrating PAM4 encoder logic according to an embodiment of the present invention.

FIG. 15 is a simplified block diagram illustrating PAM4 encoder logic according to an embodiment of the present invention. This diagram is merely an example, which should not unduly limit the scope of the claims. One of ordinary skill in the art would recognize many variations, alternatives, and modifications. As shown, the table summarizes the scheme of binary to Gray/Thermometer encoding. Binary digits include 0 and 1. For two digits bits, A and B, four combinations exist as 00, 01, 11, and 10, corresponding to four PAM symbol of 1, 2, 3, and 4. When it is encoded to Thermometer code, it is represented by 3 elements X, Y, Z encoded as 000, 100, 110, and 111. In an embodiment, the value of X can be either a same value of A or B, the value if Y can only be the same value of A, and the value of Z can be either the same value of A or reversed value of B. In a specific embodiment, a logic circuit of the PAM4 Binary to Thermometer encoder is illustrated.

In an alternative example, the present invention includes an integrated system on chip device. The device is configured on a single silicon substrate member. The device has a data input/output interface provided on the substrate member and configured for a predefined data rate and protocol. The device has an input/output block provided on the substrate member and coupled to the data input/output interface. In an example, the input/output block comprises a Serializer/Deserializer (SerDes) block, a clock data recovery (CDR) block, a compensation block, and an equalizer block, among others. The device has a signal processing block provided on the substrate member and coupled to the input/output block. In an example, the signal processing block is configured to the input/output block using a bi-direction bus in an intermediary protocol. The device has a driver module provided on the substrate member and coupled to the signal processing block. In an example, the driver module is coupled to the signal processing blocking using a uni-directional multi-lane bus. In an example, the device has a driver interface provided on the substrate member and coupled to the driver module and configured to be coupled to a silicon photonics device. In an example, the driver interface is configured to transmit output data in either an amplitude modulation format or a combination of phase/amplitude modulation format or a phase modulation format. In an example, the device has a receiver module comprising a transimpedance amplifier (TIA) block provided on the substrate member and to be coupled to the silicon photonics device using predefined modulation format, and configured to the digital signal processing block to communicate information to the input output block for transmission through the data input/output interface. In an example, the device has a communication block provided on the substrate member and operably coupled to the input/output block, the digital signal processing block, the driver block, and the receiver block, among others. The device has a communication interface coupled to the communication block. The device has a control block provided on the substrate member and coupled to the communication block.

In an example, the signal processing block comprises a forward error correction (FEC) block, a digital signal processing block, a framing block, a protocol block, and a redundancy block, among others. The driver module is selected from a current drive or a voltage driver in an example. In an example, the driver module is a differential driver or the like. In an example, the silicon photonics device is selected from an electro absorption modulator or electro optic modulator, or a Mach-Zehnder modulator. In an example, the amplified modulation format is selected from non-return to zero (NRZ) format or pulse amplitude modulation (PAM) format. In an example, the phase modulation format is selected from binary phase shift keying (BPSK) or nPSK. In an example, the phase/amplitude modulation is quad amplitude modulation (QAM). In an example, the silicon photonic device is configured to convert the output data into an output transport data in a wave division multiplexed (WDM) signal. In an example, the control block is configured to initiate a laser bias or a modulator bias. In an example, the control block is configured for laser bias and power control of the silicon photonics device. In an example, the control block is configured with a thermal tuning or carrier tuning device each of which is configured on the silicon photonics device. In an example, the SerDes block is configured to convert a first data stream of N into a second data stream of M.

In an example, the invention provides an integrated system on chip device. The device has a single silicon substrate member and a data input/output interface provided on the substrate member and configured for a predefined data rate and protocol. In an example, the device has an input/output block provided on the substrate member and coupled to the data input/output interface. The input/output block comprises a SerDes block, a CDR block, a compensation block, and an equalizer block, among others. The device has a signal processing block provided on the substrate member and coupled to the input/output block. In an example, the signal processing block is configured to the input/output block using a bi-direction bus in an intermediary protocol. In an example, the device has a driver module provided on the substrate member and coupled to the signal processing block. The driver module is coupled to the signal processing blocking using a uni-directional multi-lane bus. In an example, the device has a driver interface provided on the substrate member and coupled to the driver module and configured to be coupled to a silicon photonics device. The driver interface is configured to transmit output data in either an amplitude modulation format or a combination of phase/amplitude modulation format or a phase modulation format in an example. The device has a receiver module comprising a TIA block provided on the substrate member and to be coupled to the silicon photonics device using predefined modulation format, and configured to the digital signal processing block to communicate information to the input output block for transmission through the data input/output interface. In an example, the device has a communication block provided on the substrate member and operably coupled to the input/output block and the digital signal processing block, the driver block, and the receiver block, and others, although there may be variations. In an example, the device has a communication interface coupled to the communication block and a control block provided on the substrate member and coupled to the communication block. In an example, the control block is configured to receive and send instruction(s) in a digital format to the communication block and being configured to receive and send signals in an analog format to communicate with the silicon photonics device.

In an example, the present invention provides a monolithically integrated system on chip device configured for a multi-rate and selected format of data communication. In an example, the device has a single silicon substrate member. The device has a data input/output interface provided on the substrate member and configured for a predefined data rate and protocol. In an example, the data input/output interface is configured for number of lanes numbered from four to one hundred and fifty. The device has an input/output block provided on the substrate member and coupled to the data input/output interface, which has a SerDes block, a CDR block, a compensation block, and an equalizer block. In an example, the SerDes block is configured to convert a first data stream of N into a second data stream of M. In an example, each of the first data stream has a first predefined data rate at a first clock rate and each of the second data stream having a second predefined data rate at a second clock rate. As used herein the terms "first" and "second" do not necessarily imply order and shall be construed broadly according to ordinary meaning. In an example, the device has a signal processing block provided on the substrate member and coupled to the input/output block. The signal processing block is configured to the input/output block using a bi-direction bus in an intermediary protocol in an example. The device has a driver module provided on the substrate member and coupled to the signal processing block. In an example, the driver module is coupled to the signal processing blocking using a uni-directional multi-lane bus. In an example, the device has a driver interface provided on the substrate member and coupled to the driver module and configured to be coupled to a silicon photonics device. In an example, the driver interface is configured to transmit output data in either an amplitude modulation format or a combination of phase/amplitude modulation format or a phase modulation format. The device has a receiver module comprising a TIA block provided on the substrate member and to be coupled to the silicon photonics device using predefined modulation format, and is configured to the digital signal processing block to communicate information to the input output block for transmission through the data input/output interface. In an example, the device has a communication block provided on the substrate member and operably coupled to the input/output block, the digital signal processing block, the driver block, and the receiver block, and others, although there can be variations. In an example, the device has a communication interface coupled to the communication block and a control block provided on the substrate member and coupled to the communication block.

In an example, the present invention provides a monolithically integrated system on chip device configured for a multi-rate and selected format of data communication. In an example, the device has a single silicon substrate member. The device has a data input/output interface provided on the substrate member and configured for a predefined data rate and protocol. In an example, the data input/output interface is configured for number of lanes numbered from four to one hundred and fifty, although there can be variations. In an example, the device has an input/output block provided on the substrate member and coupled to the data input/output interface. In an example, the input/output block comprises a SerDes block, a CDR block, a compensation block, and an equalizer block, among others. In an example, the SerDes block is configured to convert a first data stream of X into a second data stream of Y, where X and Y are different integers. Each of the first data stream has a first predefined data rate at a first clock rate and each of the second data stream has a second predefined data rate at a second clock rate in an example. In an example, the device has a signal processing block provided on the substrate member and coupled to the input/output block. In an example, the signal processing block is configured to the input/output block using a bi-direction bus in an intermediary protocol. In an example, the device has a driver module provided on the substrate member and coupled to the signal processing block. In an example, the driver module is coupled to the signal processing blocking using a uni-directional multi-lane bus configured with N lanes, whereupon N is greater than M such that a difference between N and M represents a redundant lane or lanes. In an example, the device has a mapping block configured to associate the M lanes to a plurality of selected laser devices for a silicon photonics device. The device also has a driver interface provided on the substrate member and coupled to the driver module and configured to be coupled to the silicon photonics device. In an example, the driver interface is configured to transmit output data in either an amplitude modulation format or a combination of phase/amplitude modulation format or a phase modulation format. In an example, the device has a receiver module comprising a TIA block provided on the substrate member and to be coupled to the silicon photonics device using predefined modulation format, and configured to the digital signal processing block to communicate information to the input output block for transmission through the data input/output interface. The device has a communication block provided on the substrate member and operably coupled to the input/output block, the digital signal processing block, the driver block, and the receiver block, among others. The device has a communication interface coupled to the communication block and a control block provided on the substrate member and coupled to the communication block.

In an example, the device has an integrated system on chip device. The device has a single silicon substrate member and a data input/output interface provided on the substrate member and configured for a predefined data rate and protocol. In an example, the device has an input/output block provided on the substrate member and coupled to the data input/output interface. In an example, the input/output block comprises a SerDes block, a CDR block, a compensation block, and an equalizer block, among others. The device has a signal processing block provided on the substrate member and coupled to the input/output block. The signal processing block is configured to the input/output block using a bi-direction bus in an intermediary protocol. The device has a driver module provided on the substrate member and coupled to the signal processing block. In an example, the driver module is coupled to the signal processing blocking using a uni-directional multi-lane bus. In an example, the device has a driver interface provided on the substrate member and coupled to the driver module and configured to be coupled to a silicon photonics device. In an example, the driver interface is configured to transmit output data in either an amplitude modulation format or a combination of phase/amplitude modulation format or a phase modulation format. In an example, the device has a receiver module comprising a TIA block provided on the substrate member and to be coupled to the silicon photonics device using predefined modulation format, and configured to the digital signal processing block to communicate information to the input output block for transmission through the data input/output interface. In an example, the device has a communication block provided on the substrate member and operably coupled to the input/output block, the digital signal processing block, the driver block, and the receiver block, and among others. The device has a communication interface coupled to the communication block and a control block provided on the substrate member and coupled to the communication block. In an example, the device has a variable bias block configured with the control block. In an example, the variable bias block is configured to selectively tune each of a plurality of laser devices provided on the silicon photonics device to adjust for at least a wavelength of operation, a fabrication tolerance, and an extinction ratio.

In an example, the present invention provides an integrated system on chip device having a self test using a loop back technique. In an example, the device has a self-test block provided on the substrate, the self test block being configured to receive a loop back signal from at least one of the digital signal processing block, the driver module, or the silicon photonics device. In an example, the self test block comprises a variable output power switch configured to provide a stress receiver test from the loop back signal.

In an example, the invention provides an integrated system-on-chip device having a redundant laser or lasers configured for each channel. In an example, the device has a plurality of laser devices configured on the silicon photonics device. At least a pair of laser devices is associated with a channel and coupled to a switch to select one of the pair of laser devices to be coupled to an optical multiplexer to provide for a redundant laser device.

In a specific embodiment, the present invention provides an integrated system-on-chip device having a built-in self test technique. In an example, the integrated apparatus has a self test block configured through ASIC interface on the transmit lane module coupled with silicon photonics optical module and to be operable during a test operation. In an example, the self test block comprises a broad band source configured to emit electromagnetic radiation from 1200 nm to 1400 nm or 1500 to 1600 nm to a multiplexer device. In an example, the broad band source can be an LED or other suitable device. The self test block is configured to digitally monitor the performance of the transmit lane module and generate digital data diagnostics inside the integrated apparatus through the ASIC interface. This diagnostic information includes temperature of the module, transmitter optical power, receiver optical power, error rate of the received signal through the FEC, level of distortion in the received signal through the DSP, etc. The self test block also includes a self test output configured to a spectrum analyzer device external to the silicon photonics optical module.

While the above specification is a full description of the specific embodiments, various modifications, alternative constructions and equivalents may be used. Therefore, the above description and illustrations should not be taken as limiting the scope of the present invention which is defined by the appended claims.

What is claimed is:
1. An integrated communication apparatus comprising:
 a DMUX device configured to receive an incoming optical signal with at least 4 multiplexed wavelengths to get at least 4 de-multiplexed signals;

multiple photo-detectors to convert the de-multiplexed signals to current signals;
a receive lane module for processing the current signals, the receive lane module comprising a digital signal processor (DSP);
a transmit lane module for generating electrical signals, the transmit lane module comprising a forward error correction device (FEC) and encoder;
one or more DFB laser devices for producing laser signals based on the electrical signals, the DFB laser devices being characterized by a relative intensity noise (RIN) level of less than −140 dB/Hz;
one or more optical modulators configured to modulate the laser signals to generate modulated optical signals; and
a MUX device configured to multiplex the modulated optical signals and to output a multiplexed optical signal;
wherein the receive lane module further comprises a transimpedance amplifier (TIA) for amplifying the current signals, an analog-to-digital converter (ADC) for converting the current signals to digital signals, the digital signal processor (DSP) for processing the digital signals, and a Tx clock and data recovery device (Tx-CDR) to remove jitter within the digital signals before transmitting to Ethernet.

2. The integrated communication apparatus of claim 1 wherein the DEMUX device comprises one or more silicon-based delay-line interferometers (DLIs), each DLI being configured to interleave the incoming optical signal from one fiber into two waveguides each with a de-multiplexed signal in different wavelength.

3. The integrated communication apparatus of claim 1 wherein the multiple photo-detectors are configured to respectively convert the at least 4 de-multiplexed signals with different wavelengths.

4. The integrated communication apparatus of claim 1 wherein the at least 4 de-multiplexed wavelengths comprise a predetermined channel spacing selected from 50 GHz or 100 GHz.

5. The integrated communication apparatus of claim 1 wherein the ADC and the DSP are PAM-N enabled encoding format, selecting from PAM4, PAM8, or PAM16, or NRZ encoding format.

6. The integrated communication apparatus of claim 1 wherein the transmit lane module further comprises a receiving Rx-CDR and a driver (DRV).

7. The integrated communication apparatus of claim 6 wherein the driver (DRV) is using PAM-N or NRZ enabled encoding format to control the one or more DFB laser devices and the one or more optical modulators.

8. The integrated communication apparatus of claim 7 wherein the one or more optical modulators comprise silicon-based Mach Zehnder linear segmented modulator.

9. The integrated communication apparatus of claim 8 wherein the silicon-based Mach Zehnder modulator operates in a carrier depletion mode.

10. The integrated communication apparatus of claim 7 wherein the one or more optical modulators comprise a distributed configuration driven by the driver comprising a parallel array of a plurality of amplifiers, each of which is optimized with a PAM encoder to drive a single segment of a modulator.

11. The integrated communication apparatus of claim 1 wherein the MUX device comprises one or more DLIs, each DLI being a 2-to-1 power combiner.

12. The integrated communication apparatus of claim 1 further comprises a control module comprising power supplies, a microcontroller, and ASIC chips.

13. The integrated communication apparatus of claim 1 further comprises an electrical interface.

14. The integrated communication apparatus of claim 13 wherein the electrical interface is configured with 4×10 G/bits Quad Small Form-factor Pluggable (QSFP) compact, hot-pluggable format.

15. The integrated communication apparatus of claim 1 wherein the one or more DFB laser devices are configured to be stabilized with a thermoelectric cooler.

16. The integrated communication apparatus of claim 1 further comprising an optical amplifier and a dispersion compensation module for retaining data integrity of the multiplexed optical signal.

17. An integrated communication apparatus for 100 Gb/s data rate system comprising:
a DMUX device configured to interleave an incoming optical signal from a single fiber to two lights respectively with two channel wavelengths;
a dual PIN photo detector for separately detecting the two lights and respectively convert to two current signals;
a receive lane module comprising a dual linear TIA and dual PAM-enabled ADC/DSP device for processing the two current signals and generating corresponding digital signals;
a transmit lane module comprising a dual PAM driver to generate electrical signals;
two DFB laser devices for producing two laser signals with two wavelengths based on the electrical signals, the DFB laser devices being characterized by a relative intensity noise (RIN) level of less than −140 dB/Hz;
a dual optical modulator comprising a PAM encoder configured to modulate the two laser signals to generate two modulated optical signals; and
a MUX device configured to combine the two modulated optical signals to one output signal into an output fiber.

18. The integrated communication apparatus of claim 17 further comprising an electrical interface configured to provide a data signal in 4×25 G CAUI-4 format based on which the dual PAM driver generates the electrical signals.

19. The integrated communication apparatus of claim 17 wherein the transmit lane module is implemented with 28.125 GBaud PAM4 encoding for 100 Gbit/s data rate optical transmission over one of 4 CWDM channels or 40 DWDM channels with 100 GHz spacing.

* * * * *